United States Patent [19]

Busche

[11] 4,196,930
[45] Apr. 8, 1980

[54] WIND DEFLECTOR FOR PREVENTING THE ACCUMULATION OF FOREIGN MATTER ON A MOTOR VEHICLE SIDE VIEW MIRROR

[76] Inventor: Oscar H. Busche, R.R. #1, Albion, Ind. 46701

[21] Appl. No.: 965,300

[22] Filed: Dec. 1, 1978

[51] Int. Cl.² .............................................. B60J 1/20
[52] U.S. Cl. ...................................................... 296/91
[58] Field of Search ................. 296/91, 1 S; 248/476, 248/487

[56] References Cited

U.S. PATENT DOCUMENTS

| | | | |
|---|---|---|---|
| 2,243,029 | 5/1941 | Cupit | 296/91 |
| 3,647,257 | 3/1972 | Litchfield | 296/91 |
| 4,085,665 | 4/1978 | Paxton | 296/91 |
| 4,142,758 | 3/1979 | Scaife | 296/91 |

Primary Examiner—Robert R. Song
Attorney, Agent, or Firm—Ronald D. Welch

[57] ABSTRACT

An air deflector for use with a side view mirror of a motor vehicle which includes a vertical air foil and an upper and a lower air foil coupled to the upper and lower end of the vertical air foil and being mounted to the vehicle adjacent the leading edge of the side windows thereof and out of the field of view of the driver, the air foils producing a plurality of airstreams for diverting the direction of foreign material such as mud, snow and ice away from the reflecting surface of the mirror.

9 Claims, 4 Drawing Figures

WIND DEFLECTOR FOR PREVENTING THE ACCUMULATION OF FOREIGN MATTER ON A MOTOR VEHICLE SIDE VIEW MIRROR

BACKGROUND OF THE INVENTION

1. Field of the Invention

The present invention relates to devices for preventing the accumulation of foreign materials such as ice, mud, rain and the like on the side view mirror of a motor vehicle and more particulary to such device which includes a plurality of air foils or deflectors for producing a flow of air around the side view mirror, the flow of air preventing foreign matter from reaching the reflecting surface of the mirror.

2. Description of the Prior Art

Side view mirrors and in particular such mirrors utilized on trucks are not only neccesary but legally required. These mirrors, particulary when used on large trucks, provide the only effective means for enabling the driver of the vehicle to observe traffic and related conditions on both sides and to the rear of the vehicle.

Unfortunately, because such side view mirrors are mounted in positions outwardly of the side view windows of the vehicle, they are also in a position exposed to the accumulation of snow, ice, mud and other foreign material on the reflecting surfaces. This is particulary true during inclemet weather, the very time when use of the mirror becomes even more critical.

While periodic cleaning of the mirrors ensures good visability under normal driving conditions, it is difficult if not impossible for a driver to keep the surface of the side view mirrors clean during unfavorable driving conditions and when the vehicle is in motion.

To eliminate this problem, various devices for cleaning the reflecting surface of a side view mirror have been proposed. Typically, these devices incorporate various means for causing a flow of air over the reflecting surface to thereby force foreign matter from the reflecting surface. In some instances, this air is heated and even drawn by means of ducts from the interior of the vehicle. In some instances it has been proposed to provide washing systems adjacent the mirrors for automatically and physically washing the surface of the mirror. Such prior art devices known to the inventor all attempt to provide a clean reflecting surface by removing foreign matter that has accumulated on the reflecting surface.

Such devices, since they function to remove foreign material only after it has reached the surface of the mirror are less than totally effective and tend to be unduly complex, expensive, and unreliable. There exists, therefore a need for a device that will effectively prevent foreign material from reaching the surface of the mirror and which device is simple, effective, and which does not interfere with operation of the vehicle such as by imparing the drivers field of view.

SUMMARY OF THE INVENTION

Broadly, the invention is a wind deflector which is mounted to the door of a motor vehicle such as a large truck adjacent the front edge thereof and forwardly of the mirror. The deflcetor includes a plurality of air foils or air deflecting elements which divert a flow of air over outwardly and under the side view mirror. This flow of air effectively diverts the movement of foreign material such as ice, mud, snow and the like away from the mirror surface so that the mirror will remain clean for long periods of time while the vehicle is in motion.

More specifically, the wind deflector of the present invention includes a vertically disposed air foil which is mounted to the leading edge of the door frame of a motor vehicle and in vertical registry with the side windows of the vehicle, the deflector including a vertical air foil having an outwardly angled air deflector surface which creates a flow of air outwardly around the side view mirror. Upper and lower air foils are fixedly secured to the vertical air foil in positions also disposed forwardly of the side view mirror of the vehicle, the upper and lower air foils producing upwardly and downwardly deflected flows of air which pass over and under the side view mirror respectively.

In one specific embodiment of the invention, inwardly and outwardly angled air baffles are also provided on the upper and lower air foils for further improving the foreign matter diverting flow of air around the side view mirror. The vertical, upper, and lower air foils are further disposed in positions forwardly of, above, and below the side view window of the vehicle in positions entirely out of the field of view of the driver of the vehicle. The deflector surface or panal of the vertical air foil may be made from a transparent material to further obviate interference thereof with the drivers field of view.

In yet another specific embodiment, means are provided for adjusting the length of the vertical air foil and the relative angular position of the upper and lower air foils to permit adaptation of the air deflector of the present invention to different vehicles without modification and to adjust the device for different driving conditions.

It is therefore an object of the invention to provide an air deflector that produces a flow of air around the side view mirror of the motor vehicle in response to forward movement of the vehicle to thereby prevent the accumulation of foreign material on the reflecting surface of the mirror.

It is yet another object of the invention to provide such a deflector which includes means for adjusting the configuration of the deflector for use on various vehicles without modification thereof.

Still another object of the invention is to provide such an air deflector which does not interfere with the field of view of the driver of the vehicle.

Another object of the invention is to provide such a deflector of inexpensive construction.

Yet another object of the invention is to provide such a deflector which is easily mounted without alteration of the vehicle.

BRIEF DESCRIPTION OF THE DRAWINGS

The above mentioned and other features and objects of this inv-ention and the manner of attaining them will be come more apparent and the invention itself will be best understood by reference to the following description of an embodiment of the invention taken in conjunction with the accomaning drawings wherein.

DESCRIPTION OF A SPECIFIC EMBODIMENT

Figure 1:
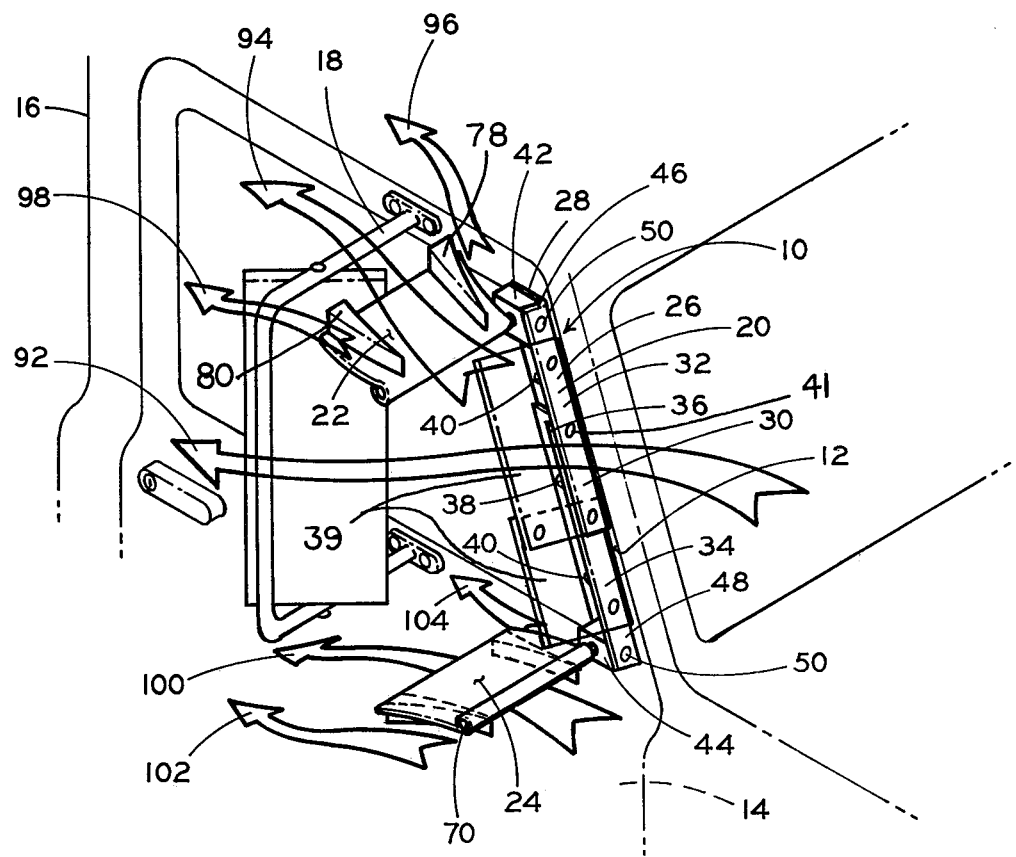
FIG. 1 is a perspective view of a air deflector of the present invention shown in its operative relationship to the side view mirror of a motor vehicle, fragmentary positions of the vehicle shown in dashed lines.

Referring now to the drawings, there is shown in FIG. 1 an air deflector indicated generaly at 10 which is fixedly mounted to the forward or leading edge 12 of the door 14 of a vehicle 16 such as a large truck in vertical registry with the vehicle side window, vehicle 16 being fitted with a conventional outwardly extending side view mirror 18.

The air deflector comprises a vertical air foil 20 and upper and lower air foils 22, 24, respectivly. Vertical air foil 20 includes an elongated angled member 26 having a base flange 28 and an outwardly (with respect to the vehicle) angled air deflecting flange 30. Preferably, member 26 is formed from two slideably engaged portions 32, 34 such that the effective vertical length of the member 30 can be adjusted as required for vehicle windows of different vertical dimensions. Members 32, 34 can, accordingly, be provided with elongated slots as at 36, positioned to be in registry, one with the other, when the members 32, 34 are disposed in overlapping engagement and secured by means such as threaded fasteners 38. Deflector panels 39 wider than flange 30 are fixedly secured to flange 30 by means such as rivits 41. Panels 39 are fabricated from a clear or transparent material such as acrylic plastic.

The vertical air foil 26 is fixedly secured to the leading edge 12 of the vehicle door 14 either by means such as clamps (not shown) fixedly secured to the member 26 and which can be clamped to the door lip or by means such as small bolts 40 can be fastened directly into the door frame, a suitable gasket (not shown) preferably being disposed between flange portion 26 and the door frame.

Mounting blocks 42, 44 are fixedly secured to deflector 26 at its upper and lower ends 46, 48 respectivly, by means such as threaded fasteners 50.

Figure 2:
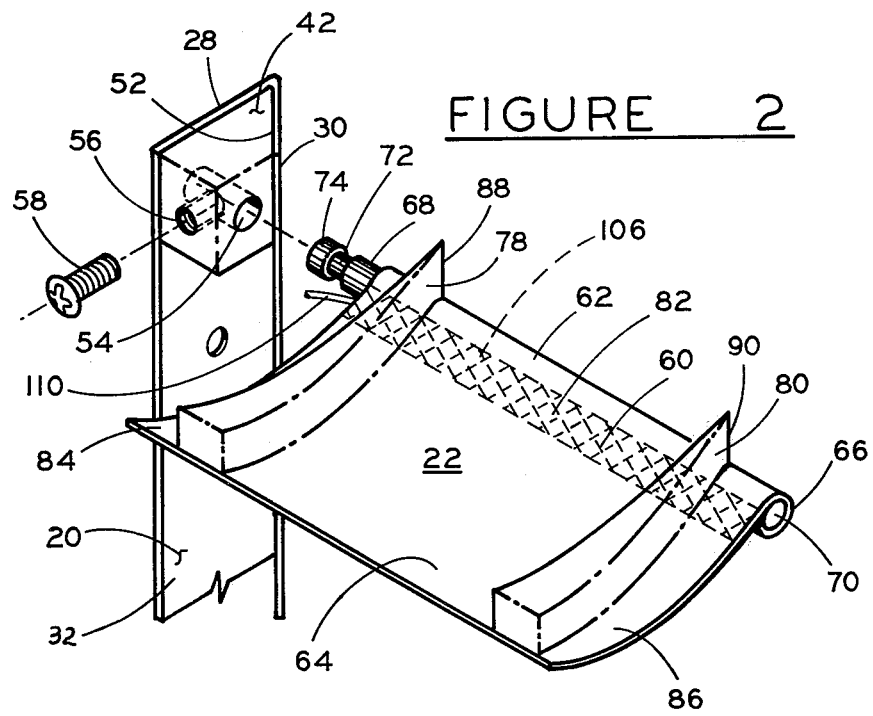
FIG. 2 is a fragmentary prespective view of the air deflector of the present invention showing details of the coupling of the upper and lower air foils to the vertical air foil.

As can best be seen in FIG. 2, mounting block 42 is generally rectangular but is provided with an angled forward edge 52 complementry to the angle between flanges 28, 30. A through hole 54 is formed through the block 42 in a direction orthogonal with respect to through hole 54 and intersecting same. A lock screw 58 is threaded into hole 56.

Still refering to FIG. 2, the upper foil 22 comprises a generally rectangular and planer panel 60. Panel 60 is, in turn, upwardly curved in a direction from its leading edge 62 is further provided with a rolled edge as at 66 and a cylindrical mounting pin 68 is fixedly secured within one end of the opening 70 formed by the rolled edge 66, pin 68 extending laterally outwardly from panel 60. A annular groove 72 is formed adjacent the distal end 74 of pin 68 in a position that is in registry with threaded hole 56 when the pin is slideably recieved within through hole 54. Thus, configured, the upper air foil 22 is coupled to the mounting block 42 by placing the pin 68 into hole 54. The air foil 22 is then angulary adjusted to compensate for the angle of the front edge of the window and for optimizing vertical deflection of air flow thereover.

Air deflecting wedges or baffles 78, 80 are fixedly secured to the top surface 82 of panel 60 adjacent the opposite ends 84, 86 thereof, respectivly. Wedges 78, 80 are fitted with their apecies 88, 90 at the leading edge 62 of panel 60, wedges 78, 80 becoming wider at the rearwardly disposed ends and otherwise having a generally rectangular longitudinal cross-section.

Lower air foil 24 is substantially identical to air foil 22 but with a opposite orientation; that is, air foil 24 is angled rearwardly and downwardly when in its operative position as shown in FIG. 1.

When the air deflector 10 is fixedly secured to the vehicle door 14 and the vehicle is in motion the vertical, upper and lower air foils 20, 22, and 24 deflect the movement of the air outwardlt around, over, and under the vehicle side view mirror 18. More specifically, the vertical air foil 20 produces an outwardly directed flow of air as indicated by arrow 92. Upper air foil 22 produces a primary flow of air upwardly and over the side view mirror 18 as indicated by arrow 94. Secondary air flows are produced by upper air foil wedges 78,80 which produce secondary air streams inwardly and outwardly over the side view mirror 18 as indicated by arrows 96, 98.

Lower air foil 24 with a corresponding wedges similarly produces primary and secondary air flows which are directed under and around the corners of the mirror 18 as indicated by arrows 100, 102, and 104.

As a result of the air foils indicated by arrows 92, thru 104, dirt, mud, rain and other foreign matter about the vehicle is prevented from reaching the reflecting surface of the mirror 18. These flows of air further divert the movement of foreign material that is airbotn in front of the vehicle. The lower air flows indicated by arrows 100, 102 and 104 are particulary effective for diverting the movement of foreign materials thrownupwardly by the wheels of the vehicle as it passes over the road.

It will be seen that air deflector is substantially passive in operation. That is, the deflector does not require manual intervention and functions entirely by reason of movement of the vehicle through the air. Further, because of the position of the deflector, the air foils 20, 22, and 24 are disposed in positions that are almost entirely out of the field of view of the driver. Portions of the deflector that may be in the drivers field of view are made of transparent material. The deflcetor is readily affixed to the door 14 of the vehicle and can be readily adjusted both in vertical dimension and in angular disposition of the upper and lower air foils to adapt the deflector for use with vehicles having different and varied window configurations.

It may be desirable to mount heating tapes of silicone "blanket" heaters to selective surfaces of the air foils such as indicated by dashed grid 106 (FIG. 2 only).

Such heaters can also be mounted to the rear surface of flange 30. Electrical power is supplied to the heaters by suitable wires as at 110 which are, in turn, connected to the electrical system of the vehicle. Such heating tapes are particulary effective for preventing the accumulation of ice on the air foils during cold weather thus preventing deterioration in the air flow patterns produced thereby.

Figure 3:
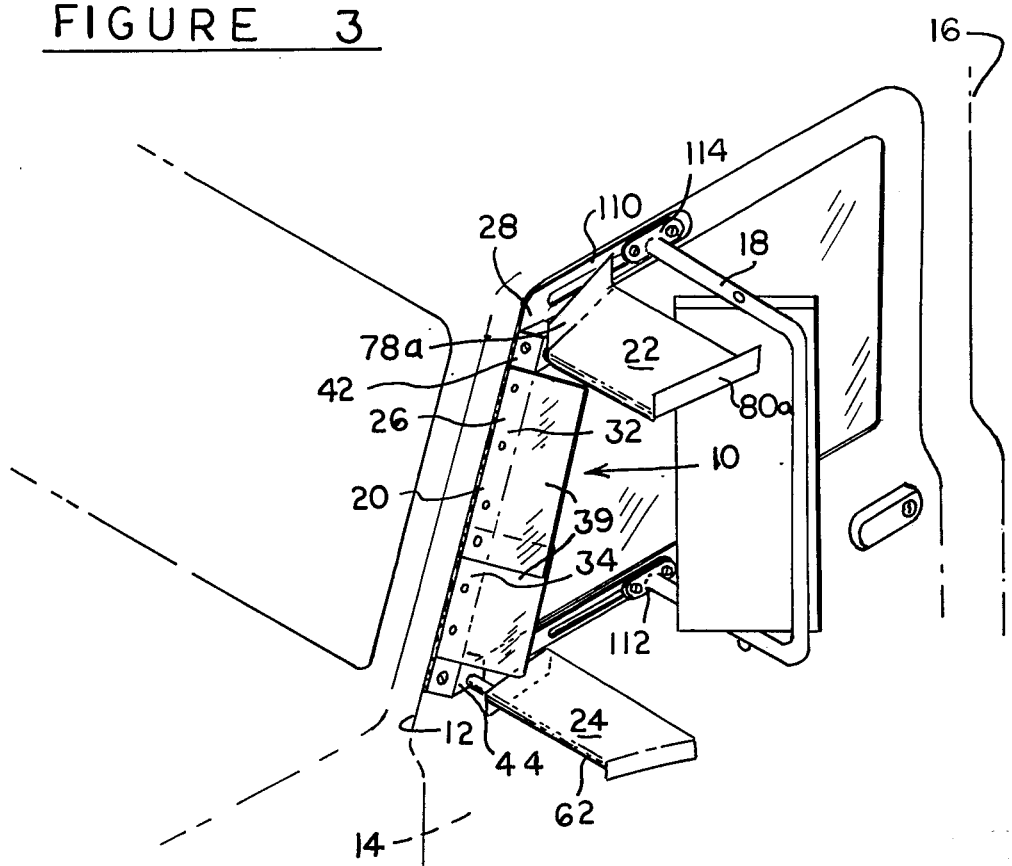
FIG. 3 is a perspective view of another embodiment of the air deflector of the present invention adapted for mounting to a vehicle using the vehicles side view mirror mounting.
Figure 4:
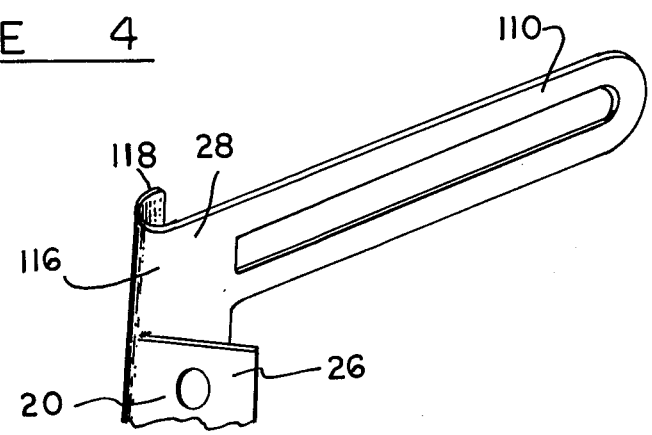
FIG. 4 is a fragmentary perspective view of the vertical air foil for the illustrating the attachment of the deflector of FIG. 3.

Refering now to FIG. 3, there is illustrated an alternate embodiment of the air deflector 10 of the present invention. In FIG. 3, the same numbers refering to corrosponding part of the embodiment of FIGS. 1 and 2 are ulitized. In the embodiment of FIG. 3, flange 28 of the vertical air foil 20 is provided with a elongated, rearwardly extending legs 110, 112. The legs 110, 112 have a length such that they extend rearwardly of the boding flanges 114 of the mirror 18. The legs 110, 112 are, accordingly, positioned beneath the mounting flanges 114 and clampingly engaged thereby.

The forward edge 116 of vertical air foil flange 28 is formed in a semi-circular figuration such that it can be hooked about the forward edge 12 of the vehcile door 14. Accordingly, in this embodiment, the deflector 10 is secured to the door by engaging the semi-circular lip 118 with the leading edge 12 of door 14, the legs 110,112 then being clamped beneath the mirror mounting flanges 114. This in turn oviates the need to drill any holes or otherwise modify the vehicle for mounting of the deflector 10.

In the embodiment illustrated in FIG. 3, the air deflecting wedges 78, 80 are shown fabricated as an integral part of the panels of the upper and lower air foils 22, 24. These deflector elements 78 small a and 80 small a can be formed by simple bending or forming tehniques.

Accordingly, the deflector can be easily fabricated from any suitable rigid material such as metal or plastic. The mounting of the upper and lower air foils can be also effected using malleable materials and the positions altered by bending. Similary, the wedges 78, and 80 can be formed as an integral part of panel 60 by suitable metal forming methods by moulding.

While there have been described above the principles of this invention in connection with specific apparatus, it is to be clearly understood that this description in made only by way of example and not as a limitation to the scope of the invention.

What is claimed is:

1. A wind deflector for use with a side view mirror of a motor vehicle comprising: vertical air foil means having upper and lower ends and including means for fixedly securing same to the front edge of the vehicle door forwardly of said rear view mirror for generating a flow of air outwardly and away from the said mirror in response to forward movement of said vehicle, lower air foil means extending laterally outwardly from said lower end of said vertical air foil means for generating a downwardly and rearwardly directed flow of air in response to said vehicles forward movement, and upper air foil means extending laterally outwardly from said upper end of said vertical air foil means for generating an upwardly and rearwardly directed flow of air in response to said vehicles forward movement.

2. The deflector of claim 1 wherein said vertical air foil means includes an elongated member having a longitudinally extending mounting flange and an air deflector flange angled outwardly and rearwardly from said mounting flange.

3. The deflector of claims 1 or 2 wherein each of said upper and said lower air foil means includes a generally planar member extending outwardly and rearwardly and downwardly with respect to the forward direction of said movement of said vehicle, respectivly, whereby, said upper and lower air foil means will generate upwardly and downwardly angled air streams in response to said forward movement of said vehicle.

4. The deflector of claim 3 wherein each of said upper and lower air foil means further includes inner and outer air deflecting baffles fixedly secured thereto in generally parallel, spaced-apart relationship, said baffles having a longitudinal dimension disposed substantially parallel to said direction of movement of said vehicle when said deflector is mounted thereto and each said baffle including a deflecting surface angled outwardly toward the proximate edges of said planar member, said baffles producing a secondary flow of air directed outwardly and over said rear view mirror in response to movement of said vehicle in said forward direction.

5. The deflector of claim 3 further including means fixedly secured adjacent the forwardly disposed edges of said air foil means for heating the leading surfaces thereof to thereby melt the ice accumulating thereon.

6. The deflector of claim 2 wherein said vertical member further includes means for adjusting the length thereof.

7. The deflector of claim 6 wherein said vertical member is formed in two complementary sections fixedly secured together in aterable overlapping relationship.

8. The deflector of claim 7 further including means for adjusting the angle of said upper and lower air foil means.

9. The deflector of claim 8 wherein said means for adjusting said angles includes mounting block means for adjustably securing said upper and lower air foil means to said upper and lower ends of said vertical air foil means, mounting pins being fixedly secured to said members and extending laterally therefrom, pin recieving sockets being formed in said mounting block means, said pins being slideably recieved and a locking screw in each said block for forceably engaging said pins when recieved in said mounting block means.

* * * * *